United States Patent [19]

Brodt et al.

[11] Patent Number: 4,851,575
[45] Date of Patent: Jul. 25, 1989

[54] PROCESS FOR THE PREPARATION OF 2-NITRO-4-SULFAMYLDIPHENYLAMINE DYESTUFFS

[75] Inventors: Werner Brodt, Hattersheim am Main; Theodor Papenfuhs, Frankfurt am Main, both of Fed. Rep. of Germany

[73] Assignee: Hoechst Aktiengesellschaft, Frankfurt am Main, Fed. Rep. of Germany

[21] Appl. No.: 55,080

[22] Filed: May 28, 1987

[30] Foreign Application Priority Data

May 30, 1986 [DE] Fed. Rep. of Germany ....... 3618219

[51] Int. Cl.⁴ .......................................... C07C 143/78
[52] U.S. Cl. .................................................... 564/87
[58] Field of Search ........................................... 564/87

[56] References Cited

U.S. PATENT DOCUMENTS 2,511,547 6/1950 Seymour et al. .

FOREIGN PATENT DOCUMENTS 191522 12/1981 Czechoslovakia .
833956 12/1981 U.S.S.R. .
625757 7/1949 United Kingdom .
585940 2/1974 United Kingdom .

OTHER PUBLICATIONS

Gilbert Sulfonation & Related Reactions, (1965), pp. 84–87.
Wagner & Zook, Synth. Org. Chem., (1965), p. 546.

Primary Examiner—Alan Siegel

[57] ABSTRACT

Process for the preparation of 2-nitro-4-sulfamyldiphenylamine dyestuffs of the formula (1)

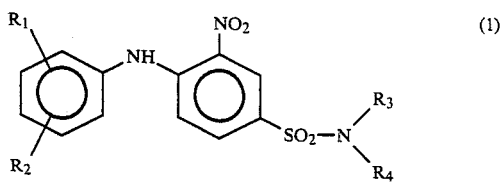

in which $R_1$ and $R_2$ each denote a hydrogen, chlorine or bromine atom or a $C_1$–$C_4$-alkyl or $C_1$–$C_4$-alkoxy group or a phenoxy group which can be substituted on the benzene nucleus by chlorine or bromine atoms or $C_1$–$C_4$-alkyl, $C_1$–$C_4$-alkoxy or trifluoromethyl groups, or denote a naphthoxy group, and $R_2$ can also be an -N-($C_1$–$C_4$-alkyl)$_2$, -NH-($C_1$–$C_4$-alkyl), -NH-($C_1$–$C_4$-alkanoyl) or -NH-benzoyl group, and $R_3$ and $R_4$ each denote a hydrogen atom or a $C_1$–$C_4$-alkyl, $C_1$–$C_2$-alkoxy-$C_1$–$C_4$-alkyl or $C_5$–$C_6$-cycloalkyl group, and $R_4$ can also be a phenyl group which can be substituted by chlorine or bromine atoms or $C_1$–$C_4$-alkyl, $C_1$–$C_4$-alkoxy, -N-($C_1$–$C_4$-alkyl)$_2$, -NH-($C_1$–$C_4$-alkyl), -NH-($C_1$–$C_4$-alkanoyl), -NH-benzoyl, phenoxy or naphthoxy groups, by sulfonating o-nitrochlorobenzene with chlorosulfonic acid at 100°–110° C. to give 4-chloro-3-nitrobenzenesulfonic acid of the formula (2)

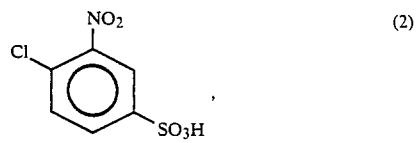

converting the latter by means of thionyl chloride at 70°–80° C. into 4-chloro-3-nitrobenzenesulfochloride, precipitating the latter on ice and subjecting the resulting 4-chloro-3-nitrobenzenesulfochloride to a condensation reaction first with an aliphatic or aromatic amine of the formula

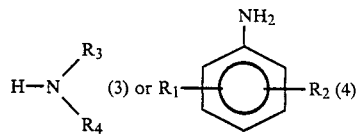

in which $R_1$, $R_2$, $R_3$ and $R_4$ have the meanings mentioned, suspended or dissolved in an aqueous solution of a basic condensation agent, the presence of an ionic or nonionic surfactant, initially at 5° to 50° C. and at pH 7.5 to 12.5, and then with an aromatic amine of the formula (4) mentioned, suspended or dissolved in an aqueous solution of a basic condensation agent, at 80° to 100° C., within the pH range mentioned and in the presence of a surfactant of the type mentioned.

8 Claims, No Drawings

PROCESS FOR THE PREPARATION OF 2-NITRO-4-SULFAMYLDIPHENYLAMINE DYESTUFFS

The invention relates to an improved process for the preparation of 2-nitro-4-sulfamyldiphenylamine dyestuffs and to an improved process for the preparation of the 4-chloro-3-nitrobenzenesulfochloride employed as an intermediate in the synthesis of these dyestuffs.

The preparation of 2-nitro-4-sulfamyldiphenylamine dyestuffs from 4-chloro-3-nitrobenzenesulfochloride is known per se. Thus, the preparation of the dyestuff 2-nitro-1,1'-diphenylamine-4-sulfanilide by reacting 4-chloro-3-nitrobenzenesulfochloride with an excess of aniline (6%) in the presence of a condensing agent (calcium carbonate or magnesium carbonate) and a surfactant (the condensation product of naphthalene-2-sulfonic acid with formaldehyde) at temperatures of 20°–100° C., with subsequent precipitation of the target product, is described in USSR Patent No. 833,956. It is emphasized in the patent mentioned that the use of salts of alkali metals as neutralizing agents results in the formation of by-products, in particular the use of sodium carbonate resulting in partial saponification of 4-chloro-3-nitrobenzenesulfochloride to the sulfonic acid, which causes the process to be non-reproducible and causes low yields of dyestuff.

A process of preparation analogous to the process of the said USSR patent is also described in Czechoslovak Patent No. 191,522, in which the use of carbonates of the alkali metals as basic condensation agents is disclosed. In order to isolate the pure 2-nitro-4-sulfamyldiphenylamine dyestuffs it is, however, necessary to purify the latter by reprecipitation (conversion into the sodium salt and precipitation of the stable α-modification by neutralization with ammonium chloride or ammonium sulfate) at 70°–100° C. This purification stage results in an increased pollution of the effluent with salts and in an increased energy requirement, as a result of which this known process suffers from disadvantages in ecological and economic respects. To this must be added that gaseous ammonia is formed in this known process, which makes it necessary to wash the exit gas, which is involved from the technical point of view, and poses toxicological problems in regard to the effluent.

It has now been found, surprisingly, that, if high-purity 4-chloro-3-nitrobenzenesulfochloride is employed, the use of salts of alkali metals having a basic reaction does not lead to the side reactions described in the USSR patent quoted, with the associated disadvantages, such as low yield of dyestuff and a non-reproducible process. On the contrary, if high-purity 4-chloro-3-nitrobenzenesulfochloride (according to the present process) is used, the 2-nitro-4-sulfamyldiphenylamine dyestuffs are obtained in the stable α-modification in good to very good yields and with a very high content of pure material (>99%, determined by HPLC (=high performance liquid chromatography)), as a result of which it is unnecessary to purify the dyestuff by a reprecipitation process such as is described in the Czechoslovak patent quoted. In economic and ecological respects, this affords a considerable advantage compared with the state of the art as given by USSR Patent No. 833,956 and/or Czechoslovak Patent No. 191,522. Thus, it has been possible to improve considerably the space-time yield in the process according to the invention.

It will be seen from this that it is of great importance to be able to prepare, in a highly pure form, the 4-chloro-3-nitrobenzenesulfochloride to be employed for the synthesis of the dyestuffs mentioned. The preparation of high-purity 4-chloro-3-nitrobenzenesulfochloride constitutes a characteristic of the process according to the invention.

The process disclosed in Chem. Ber. 24, 3185 (1891) for the preparation of 4-chloro-3-nitrobenzenesulfochloride by sulfonating o-nitrochlorobenzene, and the process disclosed in British Patent No. 585,940 for the preparation of the sulfochloride mentioned by reacting the free sulfonic acid or the sodium salt thereof with phosphorus pentachloride, do not result in the high-purity product which is required. Although an improved process for the preparation of 4-chloro-3-nitrobenzenesulfochloride by reacting o-nitrochlorobenzene with a 4-molar to 5-molar amount of chlorosulfonic acid is described in British Patent No. 625,757 and in U.S. Pat. No. 2,511,547, the disadvantages of this process lie in the production of considerable amounts of waste sulfuric acid and in the high reaction temperature to be used, which occasions problems in regard to safety of operation.

It has been found that 4-chloro-3-nitrobenzenesulfochloride can be prepared in a highly pure form by sulfonating o-nitrochlorobenzene with chlorosulfonic acid at temperatures of 100°–110° C. and converting the resulting sulfonic acid into the corresponding sulfochloride by means of thionyl chloride at 40°–80° C., preferably 65°–78° C. In this regard it is advisable to allow 2.0 to 3.5 mol, preferably 2.5 to 3.0 mol, of chlorosulfonic acid to act on 1 mol of o-nitrochlorobenzene. A larger excess of chlorosulfonic acid is admittedly not harmful, but it impairs the economy of operation of the process. It is advisable to employ the thionyl chloride in not more than a molar amount, relative to the o-nitrochlorobenzene, for the conversion of the sulfonic acid into the sulfochloride. In general, it is sufficient to use a molar ratio of 1:0.5 to 1:1.0. A molar ratio of 1:0.7–1:0.9 is preferable, because in this case the reaction takes place sufficiently fast and in very good yields. The 4-chloro-3-nitrobenzenesulfochloride obtained is crystallized on ice in a customary manner and is isolated in a technically moist form, for example as a 90% strength moist paste.

The yield of 4-chloro-3-nitrobenzenesulfochloride (free from sulfonic acid) is 94–97% of theory and the content of pure material is ≧99.5% (melting point: 59°–60° C.). The yield and purity of the product are thus appreciably higher than in the process described in British Patent No. 625,757 (88% crude yield, melting point 50° C.).

As a result of the high purity of the 4-chloro-3-nitrobenzenesulfochloride prepared by the process according to the invention, there are unforeseen advantages in the preparation of 2-nitro-4-sulfamyldiphenylamine dyestuffs, particularly in regard to yield and purity.

The present invention therefore relates to an improved process for the preparation of 2-nitro-4-sulfamyldiphenylamine dyestuffs of the general formula (1)

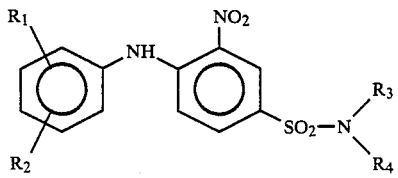

in which $R_1$ and $R_2$ each denote a hydrogen, chlorine or bromine atom or a $C_1$–$C_4$-alkyl or $C_1$–$C_4$-alkoxy group or a phenoxy group which can be substituted on the benzene nucleus by chlorine or bromine atoms or $C_1$–$C_4$-alkyl, $C_1$–$C_4$-alkoxy or trifluoromethyl groups, or denote a naphthoxy group, it being possible for $R_1$ and $R_2$ to be identical or different and, in addition, for $R_2$ also to be an -N-($C_1$–$C_4$-alkyl)$_2$, -NH-($C_1$–$C_4$-alkyl), -NH-($C_1$–$C_4$-alkanoyl) or -NH-benzoyl group, and $R_3$ and $R_4$ each denote a hydrogen atom or a $C_1$–$C_4$-alkyl, $C_1$–$C_2$-alkoxy-$C_1$–$C_4$-alkyl or $C_5$–$C_6$-cycloalkyl group, it being possible for $R_3$ and $R_4$ to be identical or different and, in addition for $R_4$ to be a phenyl group which can be substituted by chlorine or bromine atoms or $C_1$–$C_4$-alkyl, $C_1$–$C_4$-alkoxy, -N-($C_1$–$C_4$-alkyl)$_2$, -NH-($C_1$–$C_4$-alkyl), -NH-($C_1$–$C_4$-alkanoyl), -NH-benzoyl, phenoxy or naphthoxy groups, it being possible for the phenoxy groups to be substituted on the benzene nucleus by chlorine or bromine atoms or $C_1$–$C_4$-alkyl, $C_1$–$C_4$-alkoxy or trifluoromethyl groups, by sulfonating o-nitrochlorobenzene with chlorosulfonic acid at temperatures of about 100°–110° C. to give 4-chloro-3-nitrobenzenesulfonic acid of the formula (2)

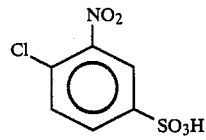

converting the latter by means of thionyl chloride at about 70°–80° C. into high-purity 4-chloro-3-nitrobenzenesulfochloride, precipitating the latter in crystalline form by bringing the reaction mixture into contact with ice, and subjecting the resulting 4-chloro-3-nitrobenzenesulfochloride to a condensation reaction first with an aliphatic or aromatic amine of the general formula

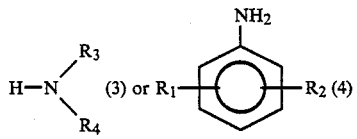

in which $R_1$, $R_2$, $R_3$ and $R_4$ have the meanings mentioned above, suspended or dissolved in an aqueous solution of a basic condensation agent, in the presence of an ionic or nonionic surfactant at temperatures of about 5° to 50° C. and at pH values from 7.5 to 12.5, and then with an aromatic amine of the general formula (4) mentioned, suspended or dissolved in an aqueous solution of a basic condensation agent, at temperatures of about 80° to 100° C., within the pH range mentioned and in the presence of a surfactant of the type mentioned, to give the dyestuffs of the formula (1) mentioned.

Suitable basic condensation agents for the reaction of the high-purity 4-chloro-3-nitrobenzenesulfochloride with an amine of the formula (3) or (4) mentioned are alkali metal salts having a basic reaction, such as, for example, sodium carbonate, sodium bicarbonate, potassium carbonate or potassium bicarbonate, or dilute aqueous solutions of lithium, sodium or potassium hydroxide.

When the 4-chloro-3-nitrobenzenesulfochloride is reacted, the chlorine atom of the sulfochloride group reacts first, i.e. in a first stage, with an aliphatic amine of the formula (3) or with an aromatic amine of the formula (4), and the chlorine atom attached to the aromatic nucleus then reacts, in a second stage, with an aromatic amine of the formula (4).

If the reaction is carried out using an aromatic amine in the first stage too, the aromatic amines of the general formula (4) employed in the first and second stages can be identical or different.

The advantage of this process lies in the fact that 2-nitro-4-sulfamyldiphenylamine dyestuffs of the general formula (1), which can be substituted on the nitrogen atom of the sulfonamide group by an aliphatic or cycloaliphatic radical or by an optionally substituted phenyl radical, are accessible, in the course of a simple onepot reaction, without the isolation of an intermediate stage and in a high yield and very high state of purity. Hitherto, it has been necessary to prepare dyestuffs of this type in a technically disadvantageous manner in several reaction stages, for example by reacting 4-chloro-3-nitro-benzenesulfonic acid with an aromatic amine, isolating the diphenylaminesulfonic acid formed as an intermediate and converting it into the sulfochloride and subsequently reacting the latter with an aliphatic or optionally substituted aromatic amine.

It is advisable to use the following detailed procedure when subjecting 4-chloro-3-nitrobenzenesulfochloride to a condensation reaction with an amine of the formula (3) and/or (4) mentioned: the amine is suspended or dissolved in an aqueous solution of the basic condensation agent, and a solubilizing surfactant is added in a small amount, advisably in an amount of about 1 to 10% by weight, relative to the acid chloride. The moist 4-chloro-3-nitrobenzenesulfochloride is then introduced into the aqueous suspension of the reactants at about 5° to 45° C. in portions or continuously, depending on the nature of the basic condensation agent. The reaction mixture is then warmed to 35°–45° C. and is stirred for 2 to 5 hours at pH 7.5 to 12.5, preferably at pH 8.5 to 9.5. It is then heated to 100° C. and is stirred for 7 to 10 hours at the pH values mentioned above. In the event of employing aromatic amines, which are used in an excess of 1 to 5%, preferably 2.5%, relative to the 4-chloro-3-nitrobenzenesulfochloride employed, the amines are then completely removed from the reaction mixture by passing in steam. The dyestuff of the general formula (1) crystallizes out as early as during the steam distillation, and, after the reaction mixture has cooled, is isolated as a moist product by filtration. The aromatic amine employed in excess can be isolated from the steam distillate and employed for subsequent batches without disadvantages in respect of yield and product purity.

The following may be mentioned as examples of suitable surfactants in the presence of which the condensation of the 4-chloro-3-nitrobenzenesulfochloride with an amine of the formula (3) or (4) mentioned is carried out: alkylsulfonates, aralkylsulfonates, alkylnaphthalenesulfonates, polyglycol ethers, alkylphenyl polyglycol ethers, alkylnaphthyl polyglycol ethers and condensation products of naphthalenesulfonic acids with formaldehyde [cf. in this respect Lehrbuch der Textilchemie ("Textbook of Textile Chemistry") by H. Rath, Springer-Verlag Berlin/Göttingen/Heidelberg (1963), pages 656–672].

The effluent from both the process stage of sulfochloride formation and the condensation of the sulfochloride with the amine is biodegradable, which is advantageous on ecological grounds. A further advantage in the process according to the invention is that less waste sulfuric acid is produced as a result of using thionyl chloride as the chlorination agent.

The 2-nitro-4-sulfamyldiphenylamine dyestuffs which can be obtained in accordance with the process are suitable for dyeing natural or synthetic fiber materials, such as, for example, silk, polyamide fibers, polyester fibers or polyether fibers. They are also used as a principal component in the preparation of valuable dyestuff mixtures.

The examples below are intended to illustrate the process according to the invention in greater detail, without limiting it thereto.

EXAMPLE 1 (4-Chloro-3-nitrobenzenesulfochloride)

176.5 g of chlorosulfonic acid are initially placed in a round-bottomed flask at 100° C, and under an atmosphere of nitrogen. 78.8 g of o-nitrochlorobenzene are added dropwise in the course of approx. 30 minutes, and stirring is continued for 4 hours at 105°-110° C. The mixture is allowed to cool to 70° C. and 53.6 g of thionyl chloride are added dropwise in the course of one hour. Stirring is then continued for 2 hours at 75°-80° C., in the course of which the exit gases formed are absorbed in 2 wash bottles connected in series and charged with water or 13% strength sodium hydroxide solution. After cooling to room temperature, the reaction mixture is added dropwise, in the course of one hour, to 1500 g of ice and 1000 g of water. The colorless 4-chloro-3-nitrobenzenesulfochloride which has crystallized out is filtered off and washed with 2000 g of water. 138 g of water-moist 4-chloro-3-nitrobenzenesulfochloride are obtained, having a water content of approx. 10% and a content (after drying) of pure material of ≧99.5%, which corresponds to a yield of 97% of theory. The melting point is 59°–60° C. (after drying).

EXAMPLE 2 (4-Chloro-3-nitrobenzenesulfochloride)

The procedure is as described in Example 1, with the difference that only 145.6 g of chlorosulfonic acid are initially taken instead of 176.5 g. 136 g of water-moist 4-chloro-3-nitrobenzenesulfochloride are obtained, having a water content of approx. 11%, which corresponds to a yield of 94.9% of theory.

EXAMPLE 3 (4-Chloro-3-nitrobenzenesulfochloride)

The procedure is as described in Example 3, but with the difference that 41.6 g of thionyl chloride are employed instead of 53.6 g of thionyl chloride. 137 g of watermoist 4-chloro-3-nitrobenzenesulfochloride are obtained, having a water content of approx. 10%, which corresponds to a yield of 95.8% of theory.

EXAMPLE 4 (2-Nitrodiphenylamine-4-sulfanilide)

(C.I. Disperse Yellow 42)

97.6 g of aniline and 5.0 g of an auxiliary based on a condensation product formed from naphthalenesulfonic acid and formaldehyde are suspended in a solution of 58.3 g of sodium carbonate in 270 g of water. 138 g of 4-chloro-3-nitrobenzenesulfochloride, prepared in accordance with Example 1, are then introduced in the course of 30 minutes at 20°-25° C., with external cooling, and stirring is then continued for 4 hours at 40° C. The mixture is then heated to 100° C. and stirred for approx. 9-10 hours. The progress of the reaction is followed by means of HPLC. The reaction is discontinued when the intermediate product 4-chloro-3-nitrobenzenesulfanilide is present in the reaction mixture in proportions less than 0.3–0.5%; the content of 2-nitrodiphenylamine-4-sulfanilide is then approx. 95-96% (in each case HPLC area percentages, not calibrated). After cooling to room temperature, the batch is diluted with 65 g of water and the excess aniline is then blown out by passing in steam. After the mixture has cooled to approx. 25° C., the 2-nitrodiphenylamine-4-sulfanilide which has crystallized out is filtered off with suction and washed with 1000 g of water. This gives 250 g of a 70% strength moist paste of the dyestuff 2-nitrodiphenylamine-4-sulfanilide (C.I. Disperse Yellow 42) containing (after drying) 99.5% of pure material, corresponding to a yield of 94% of theory. Melting point (after drying): 154°–155° C.

EXAMPLE 5 (2-Nitrodiphenylamine-4-sulfanilide)

The procedure is as described in Example 4, with the difference that 102.3 g of aniline are employed instead of 97.6 g of aniline. 270.5 g of water-moist, 65% strength 2-nitrodiphenylamine-4-sulfanilide are obtained, which corresponds to a yield of 95.2% of theory.

EXAMPLE 6 (2-Nitrodiphenylamine-4-sulfanilide)

The procedure is as described in Example 4, with the difference that 92.4 g of sodium bicarbonate are employed instead of 58.3 g of sodium carbonate. 251.5 g of watermoist, 69.4% strength 2-nitrodiphenylamine-4-sulfanilide are obtained, which corresponds to a yield of 94.5% of theory.

EXAMPLE 7 (2-Nitrodiphenylamine-4-sulfanilide)

102.3 g of aniline and 5.0 g of a surfactant based on a condensation product formed from naphthalenesulfonic acid and formaldehyde are suspended in a solution of 76.0 g of potassium carbonate in 300 g of water. 138 g of 4-chloro-3-nitrobenzenesulfochloride, prepared in accordance with Example 1, are then introduced at not higher than 5°–10° C., with external cooling by means of ice. The mixture is allowed to warm up to room temperature in the course of 1 hour and is then stirred for a further 3 hours at 45° C. It is then heated to 100° C., and the procedure described in Example 4 is followed. This gives 237 g of watermoist, 69% strength 2-nitrodiphenylamine-4-sulfanilide, which corresponds to a yield of 89% of theory.

EXAMPLE 8

(2-Nitrodiphenylamine-4-sulfo-p-toluidide)

27.0 g of 4-aminotoluene and 7 g of a surfactant based on a condensation product formed from naphthalenesulfonic acid and formaldehyde are suspended in a solution of 58.3 g of sodium carbonate in 300 g of water. 138 g of 4-chloro-3-nitrobenzenesulfochloride, prepared in accordance with Example 1, are then introduced at not higher than 20° C., and the mixture is then stirred for 4–5 hours at 35° C. 24.0 g of aniline are then added and the mixture is heated to 100° C. When the reaction is complete (determination of end point by HPLC), the mixture is worked up as described in Example 4. This gives 274 g of 2-nitrodiphenylamine-4-sulfo-p-toluidide in the form of a 65% strength moist paste having a content of 98% (HPLC) of pure material, which corresponds to a yield of 91% of theory.

EXAMPLE 9
(2-Nitrodiphenylamine-4-(N-butyl)-sulfonamide)
(C.I. Disperse Yellow 59)

18.5 g of n-butylamine and 5 g of a surfactant based on a condensation product formed from naphthalenesulfonic acid and formaldehyde are suspended in a solution of 58.3 g of sodium carbonate in 270 g of water. 138 g of 4-chloro-3-nitrobenzenesulfochloride, prepared in accordance with Example 1, are then introduced at 15°–20° C. The mixture is then stirred for a further 6 hours at 30° C., 24.0 g of aniline are introduced and stirring is continued for 10 hours at 100° C. The mixture is then worked up as described in Example 4. This gives 196 g of 2-nitro-diphenylamine-4-(N-butyl)-sulfonamide (C.I. Disperse Yellow 59) ($R_3=H$; $R_4=n-C_4H_9$) in the form of an 85% strength moist paste containing 98.5% of pure material, which corresponds to a yield of 92.8% of theory. Melting point (after drying): 134° C.

We claim:
1. A process for the preparation of 2-nitro-4-sulfamyl-diphenylamine dyestuffs of the formula (1)

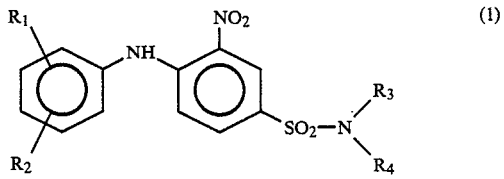

in which $R_1$ and $R_2$ each denote a hydrogen, chlorine or bromine atom or a $C_1$–$C_4$-alkyl or $C_1$–$C_4$-alkoxy group or a phenoxy group which can be substituted on the benzene nucleus by chlorine or bromine atoms or $C_1$–$C_4$-alkyl, $C_1$–$C_4$-alkoxy or trifluoromethyl groups, or denote a naphthoxy group, it being possible for $R_1$ and $R_2$ to be identical or different and, in addition, for $R_2$ also to be an -N-($C_1$–$C_4$-alkyl)$_2$, -NH-($C_1$–$C_4$-alkyl), -NH-($C_1$–$C_4$-alkanoyl) or -NH-benzoyl group, and $R_3$ and $R_4$ denote a hydrogen atom or a $C_1$–$C_4$-alkyl, $C_1$–$C_2$-alkoxy-$C_1$–$C_4$-alkyl) or $C_5$–$C_6$-cycloalkyl group, it being possible for $R_3$ and $R_4$ to be identical or different and, in addition, for $R_4$ to be a phenyl group which can be substituted by chlorine or bromine atoms or $C_1$–$C_4$-alkyl, $C_1$–$C_4$-alkoxy, -N-($C_1$–$C_4$-alkyl)$_2$, -NH-($C_1$–$C_4$-alkyl), -NH-($C_1$–$C_4$-alkanoyl), -NH-benzoyl, phenoxy or naphthoxy groups, it being possible for the phenoxy groups to be substituted on the benzene nucleus by chlorine or bromine atoms or $C_1$–$C_4$-alkyl, $C_1$–$C_4$-alkoxy or trifluoromethyl groups, which comprises sulfonating o-nitrochlorobenzene with chlorosulfonic acid at temperatures of about 100°–110° C. to give 4-chloro-3-nitrobenzenesulfonic acid of the formula (2)

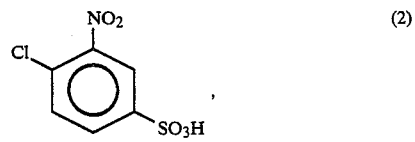

converting the latter at about 70°–80° C., by means of a reagent consisting essentially of thionyl chloride, into high-purity 4-chloro-3-nitrobenzenesulfochloride, precipitating the latter in crystalline form by bringing the reaction mixture into contact with ice, and subjecting the resulting 4-chloro-3-nitrobenzenesulfochloride to a condensation reaction first with an aliphatic or aromatic amine of the formula

in which $R_3$ and $R_4$ are as previously defined, suspended or dissolved in an aqueous solution of a basic condensation agent, in the presence of an ionic or nonionic surfactant, initially at temperatures of about 5 to 50° C. and at pH values from 7.5 to 12.5, and then with an aromatic amine of the formula (4)

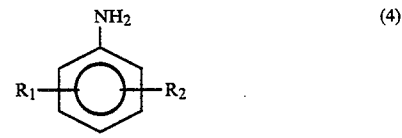

wherein $R_1$ and $R_2$ are as previously defined, suspended or dissolved in an aqueous solution of a basic condensation agent, at temperatures of about 80 to 100° C., within the pH range mentioned and in the presence of a surfactant of the type mentioned, to give the dyestuffs of the said formula (1).

2. The process as claimed in claim 1, wherein the condensation of 4-chloro-3-nitrobenzenesulfochloride with an amine is carried out in the presence of an alkylsulfonate, aralkylsulfonate, alkylnapthalenesulfonate, polyglycol ether, alkylphenyl polyglycol ether, alkylnaphthyl polyglycol ether or a condensation product of a naphthalenesulfonic acid with formaldehyde as the surfactant.

3. The process as claimed in claim 1, wherein the basic condensation agent used in the reaction of 4-chloro-3-nitrobenzenesulfochloride with an amine is sodium carbonate, sodium bicarbonate, potassium carbonate or potassium bicarbonate or a dilute aqueous solution of lithium, sodium or potassium hydroxide.

4. The process as claimed in claim 1, wherein the sulfonating of the o-nitrochlorobenzene with chlorosulfonic acid and the conversion of the resulting compound of formula (2) into high-purity 4-chloro-3-nitrobenzene sulfochloride are carried out in the same reaction zone, without isolation of the product of formula (2).

5. The process as claimed in claim 1, wherein the amount of thionyl chloride employed to convert the compound of formula (2) into high-purity 4-chloro-3-nitrobenzene sulfochloride is an effective amount which does not exceed a molar amount, relative to the o-nitrochlorobenzene starting material.

6. The process as claimed in claim 4, wherein the amount of thionyl chloride employed to convert the compound of formula (2) into high-purity 4-chloro-3-nitrobenzene sulfochloride is an effective amount which does not exceed a molar amount, relative to the o-nitrochlorobenzene starting material.

7. The process as claimed in claim 6, wherein the molar ratio of starting material to thionyl chloride is from 1:0.5 to 1:1.0.

8. The process as claimed in claim 6, wherein the molar ratio of starting material to thionyl chloride is from 1:0.7 to 1:0.9.

* * * * *